(12) United States Patent
Zhang et al.

(10) Patent No.: US 9,942,552 B2
(45) Date of Patent: Apr. 10, 2018

(54) LOW BITRATE VIDEO CODING

(71) Applicant: Intel Corporation, Santa Clara, CA (US)

(72) Inventors: Ximin Zhang, San Jose, CA (US); Sang-Hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 75 days.

(21) Appl. No.: 14/737,795

(22) Filed: Jun. 12, 2015

(65) Prior Publication Data

US 2016/0366414 A1    Dec. 15, 2016

(51) Int. Cl.
| | |
|---|---|
| H04N 19/132 | (2014.01) |
| H04N 19/177 | (2014.01) |
| H04N 19/16 | (2014.01) |
| H04N 19/503 | (2014.01) |
| H04N 19/126 | (2014.01) |
| H04N 19/184 | (2014.01) |
| H04N 19/187 | (2014.01) |
| H04N 19/147 | (2014.01) |
| H04N 19/172 | (2014.01) |
| H04N 19/149 | (2014.01) |
| H04N 19/103 | (2014.01) |

(52) U.S. Cl.
CPC ......... *H04N 19/132* (2014.11); *H04N 19/103* (2014.11); *H04N 19/126* (2014.11); *H04N 19/147* (2014.11); *H04N 19/149* (2014.11); *H04N 19/16* (2014.11); *H04N 19/172* (2014.11); *H04N 19/177* (2014.11); *H04N 19/184* (2014.11); *H04N 19/187* (2014.11); *H04N 19/503* (2014.11)

(58) Field of Classification Search
None
See application file for complete search history.

(56) References Cited

U.S. PATENT DOCUMENTS

| | | | | |
|---|---|---|---|---|
| 5,670,993 | A | * | 9/1997 | Greene .................... G09G 5/39 345/556 |
| 8,369,398 | B2 | * | 2/2013 | Pao .................. H04N 21/23406 375/240.05 |
| 8,774,272 | B1 | | 7/2014 | Chen |
| 2005/0031032 | A1 | | 2/2005 | Shen et al. |
| 2006/0093320 | A1 | * | 5/2006 | Hallberg .................. H04N 5/76 386/241 |
| 2007/0171972 | A1 | | 7/2007 | Tian et al. |
| 2008/0025388 | A1 | | 1/2008 | Kim et al. |

(Continued)

OTHER PUBLICATIONS

International Search Report and Written Opinion for International Patent Application No. PCT/US2016/030755, dated Aug. 12, 2016.

*Primary Examiner* — Mohammad J Rahman
(74) *Attorney, Agent, or Firm* — Green, Howard & Mughal, LLP

(57) ABSTRACT

Techniques related to video coding with low bitrates are discussed. Such techniques may include skipping coding of a picture of a group of pictures when an estimated coding bit cost of the picture is greater than an available coding bit limit for the picture and, when the estimated coding bit cost is not greater than the available coding bit limit, determining the coding skip indicator based on a picture type of the individual picture and a picture structure of the group of pictures.

22 Claims, 6 Drawing Sheets

(56) References Cited

U.S. PATENT DOCUMENTS

| | | | |
|---|---|---|---|
| 2008/0219357 A1* | 9/2008 | Pao | H04N 21/23406 375/240.26 |
| 2009/0022218 A1* | 1/2009 | Kim | H04N 19/70 375/240.03 |
| 2009/0232217 A1* | 9/2009 | Lee | G06T 7/2026 375/240.16 |
| 2012/0057636 A1* | 3/2012 | Tian | H04N 7/147 375/240.24 |
| 2013/0089140 A1 | 4/2013 | Kudana et al. | |
| 2014/0168362 A1* | 6/2014 | Hannuksela | H04N 13/0048 348/43 |
| 2016/0219306 A1* | 7/2016 | Pettersson | H04N 19/176 |
| 2016/0277739 A1* | 9/2016 | Puri | H04N 19/61 |

* cited by examiner

LOW BITRATE VIDEO CODING

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In some contexts, low bitrate video encoding may be advantageous, particularly for real time video streaming services and the like. A current technique for providing low bitrate video encoding includes increasing the quantization parameter (QP) to reduce the bitrate as needed. However, in some examples, the required low bitrate cannot be achieved even with the highest QP value. Additionally, multi-pass encoder may provide a skip mode to provide lower bitrate encoding. However, such multi-pass techniques may not be provided in one-pass hardware encoding implementations. Furthermore, conventional rate based skip selection techniques may cause subjective quality problem such as jittering if B-pictures, interlaced fields, or temporal scalability are implemented.

It may be advantageous to low bitrate video encoding with high subjective video quality. It is with respect to these and other considerations that the present improvements have been needed. Such improvements may become critical as the desire to compress video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
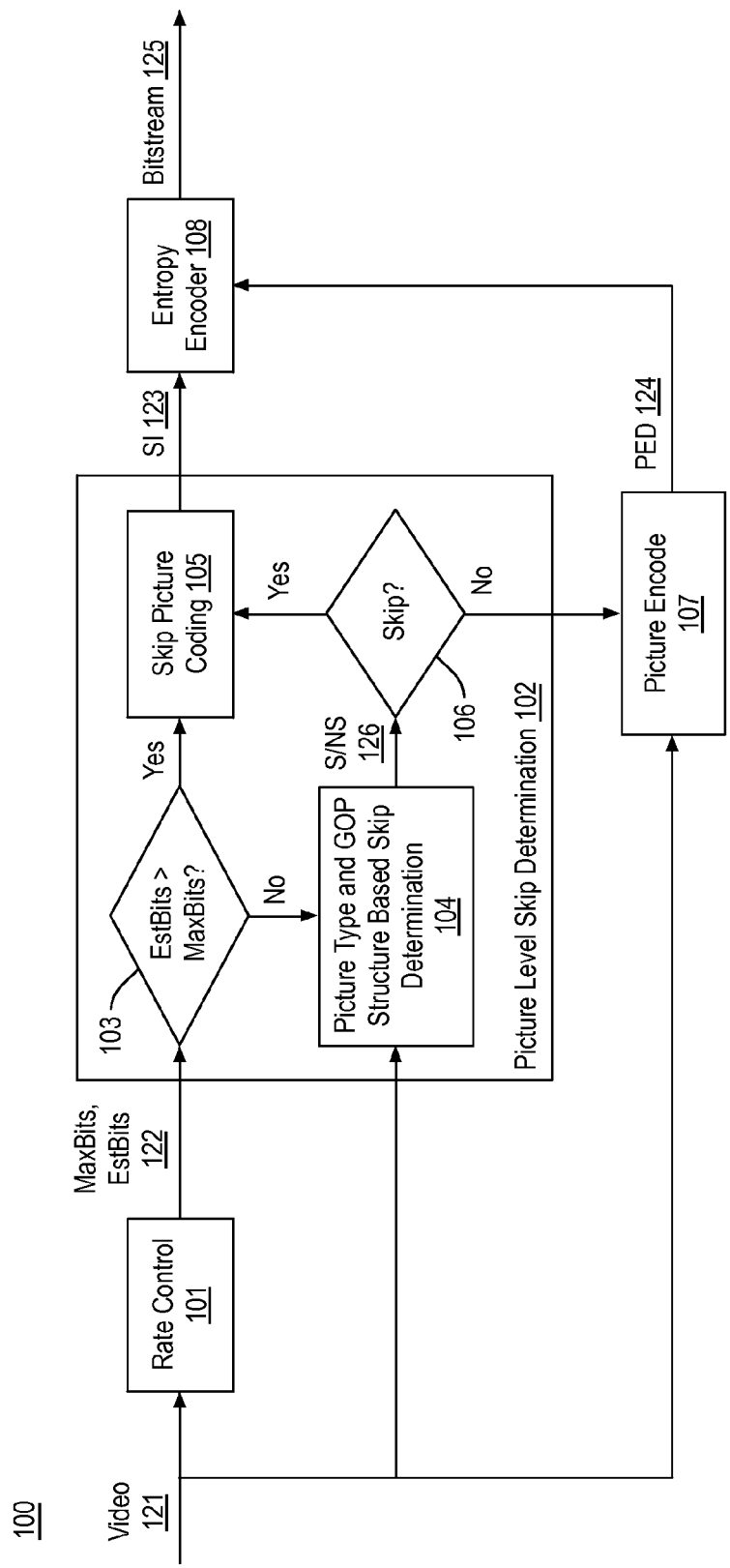
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to providing picture level coding skip decisions.

As described above, it may be advantageous to provide low bitrate video coding with high subjective video quality. In some embodiments discussed herein, video coding may include determining an available coding bit limit and an estimated coding bit cost for an individual picture of a group of pictures. Based on the available coding bit limit and the estimated coding bit cost for the individual picture, a picture level skip determination may be made to skip coding of the picture when the estimated coding bit cost is greater than the available coding bit limit. For example, a coding skip indicator (e.g., a flag or bit or the like) may be set to skip when the estimated coding bit cost is greater than the available coding bit limit. When the estimated coding bit cost is not greater than the available coding bit limit, a picture level skip determination may be made based on a picture type of the individual picture and a picture structure of the group of pictures. Such picture type and group of picture structure based picture level skip determinations are discussed further herein.

Such techniques may provide adaptive picture level skip decisions or determinations to achieve target bitrates (e.g., low and/or extremely low target bitrates) without jittering artifacts or the requirement of multi-pass coding. For example, a skip decision may be made based on rate control and content analysis (e.g., the available coding bit limit, the estimated coding bit cost, and the like) to meet the bitrate target. A picture type and coding structure based adaptive skip decision may then be applied. Such picture type and coding structure based adaptive skip decision may be applied to B-pictures (e.g., bi-prediction pictures), interlaced coding fields, or the like. Such techniques may meet the target bitrate and reduce artifacts such as jittering artifacts or the like.

FIG. 1 is an illustrative diagram of an example system 100 for providing video coding, arranged in accordance with at least some implementations of the present disclosure. As shown in FIG. 1, system 100 may include a rate control module 101, a picture level skip determination module 102, a picture encode module 107, and an entropy encoder 108. Also as shown, picture level skip determination module 102 may include a comparator module 103 (e.g., labeled EstBits>MaxBits?), a picture type and group of pictures (GOP) structure based skip determination module 104, a skip picture coding module 105, and a skip evaluation module 106 (e.g., labeled Skip?).

Also as shown, rate control module 101 and picture level skip determination module 102 may receive video 121. System 100 may provide, for example, video compression and system 100 may be a video encoder implemented via a computer or computing device or the like. For example, system 100 may generate a bitstream 125 that is compatible with a video compression-decompression (codec) standard such as the H.264/MPEG-4 advanced video coding (AVC) standard, the MPEG-2 coding standard, the high efficiency video coding (HEVC) standard, the VP8 standard, the VP9 standard or the like. System 100 may be implemented via any suitable device such as, for example, a personal computer, a laptop computer, a tablet, a phablet, a smart phone, a digital camera, a gaming console, a wearable device, a display device, an all-in-one device, a two-in-one device, or the like or platform such as a mobile platform or the like. For example, as used herein, a system, device, computer, or computing device may include any such device or platform.

System 100 may include other modules not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity in presenting the described techniques.

As discussed, rate control module 101 and picture level skip determination module 102 may receive video 121. Video 121 may include any suitable video frames, video pictures, sequence of video frames, group of pictures, groups of pictures, video data, or the like in any suitable resolution. For example, video 121 may be video graphics array (VGA), high definition (HD), Full-HD (e.g., 1080p), or 4K resolution video, or the like. Furthermore, video 121 may include any number of video frames, sequences of video frames, pictures, groups of pictures, or the like. Techniques discussed herein are discussed with respect to pictures and groups of pictures for the sake of clarity of presentation. However, such pictures and groups of pictures may be characterized as frames, video frames, sequences of frames, video sequences, or the like.

As shown in FIG. 1, rate control module 101 may determine, for individual pictures of video 121, an available coding bit limit and an estimated coding bit cost. For example, rate control module 101 may provide a signal 122 including the available coding bit limit (e.g., MaxBits) and the estimated coding bit cost (e.g., EstBits) to picture level skip determination module 102. For example, the available coding bit limit may be a maximum amount of allowed bits for coding the picture. The available coding bit limit may be characterized as maximum bits, maximum coding bits, or the like for the current picture. Furthermore, the estimated coding bit cost may be an estimate of the minimum number of bits needed to encode the current picture. The estimated coding bit cost may be characterized as minimum bits, minimum needed bits, or the like for the current picture.

The available coding bit limit for the current picture may be determined using any suitable technique or techniques. For example, the available coding bit limit may be based on current buffer conditions and/or an average target rate for coding each picture of video 121. In some examples, the available coding bit limit, for a current picture of video 121, may be a sum of a hypothetical reference decoder buffer fullness (e.g., a current buffer condition) associated with an immediately prior encode picture and an average target rate for each picture of the group of pictures. For example, the available coding bit limit may be determined as shown in Equation (1):

$$\text{MaxBits}[N] = \text{buffer\_fullness}[N-1] + T \qquad (1)$$

where MaxBits may be the available coding bit limit, buffer fullness may be the buffer fullness of a hypothetical reference decoder, N may indicate the current picture, N−1 may indicate a previous encode picture (e.g., in an encode order), and T may be an average target rate for each picture of video 121. For example, buffer_fullness[N−1] may be a hypothetical reference decoder (HRD) buffer fullness after picture N−1 is coded such that picture N−1 may be an immediately prior encode picture with respect to the current picture.

Furthermore, the estimated coding bit cost for the current picture may be determined using any suitable technique or techniques. For example, the estimated coding bit cost may be based on an estimation of the coding cost (e.g., in bits) of coding the current picture. In some examples, the estimated coding bit cost may be based on video analysis based prediction distortion of the current picture, video analysis based prediction distortion of a previous picture of the same type as the current picture, the actual number of bits used to code the previous picture of the same type, the quantization parameter (QP) of the previous picture of the same type, and a maximum available QP (e.g., based on the coding standard being implemented or the like).

In some examples, the estimated coding bit cost may be a product of an actual coding bit cost of a prior encode picture with respect to the current, a ratio of a distortion of the individual picture to a distortion of the prior picture, and a ratio of a quantization parameter associated with the prior picture to a maximum quantization parameter. In some examples, the prior picture used to determine the estimated coding bit cost may of the same type as the current picture. For example, the estimated coding bit cost may be determined as shown in Equation (2):

$$EstBits[N]=Distortion[N]*ActualBits[N-c]*QP[N-c]/(Distortion[N-c]*MaxQP) \quad (2)$$

where EstBits may be the estimated coding bit cost, Distortion may be a video analysis based prediction distortion, ActualBits may be an actual number of coding bits, QP may be a quantization parameter, MaxQP may be a maximum available quantization parameter, N may indicate the current picture, c may indicate a picture distance between the current picture and a previous picture of the same type, N may indicate the current picture, and N−c may indicate a previous picture of the same type as picture N. For example, MaxQP may be 31 for MPEG-2 and 51 for AVC and HEVC. Furthermore, c may be determined from video 121 and, as discussed, may indicate a picture distance between the current picture and a previous picture of the same type. For example, for a P-picture in an IPPP coding structure (e.g., a coding structure without B-pictures), c may be one. If no same picture type is available, the estimated coding bit cost for the current picture maybe based on the immediate prior picture (e.g., in an encode order of the pictures) with respect to the current picture.

As shown, picture level skip determination module 102 (e.g., via comparator module 103) may receive the available coding bit limit and the estimated coding bit cost for the current picture via signal 122. Comparator module 103 may compare the available coding bit limit and the estimated coding bit cost for the current picture. If the estimated coding bit cost is greater than available coding bit limit (e.g., or greater than or equal to, or not less than, or the like), comparator module 103 may provide a signal to skip picture coding module 105 for the current picture. Skip picture coding module 105 may, based on the received signal indicating a skip for the current picture, generate a skip indicator (SI) 123 for the current picture to set a coding skip indicator to skip for the current picture and provide skip indicator 123 to entropy encoder 108 for entropy encoding and inclusion in bitstream 125. Skip indicator 123 may be a picture level skip indicator indicating coding is skipped for the current picture. For example, if the estimated coding bit cost is greater than available coding bit limit for the current picture, coding of the current picture may be skipped (e.g., for all blocks or coding units or the like of the current picture) and such skipping of the current picture may be indicated (e.g., to a decoder or the like) via skip indicator 123 being entropy encoded and included in bitstream 125.

If comparator module 103 determines the estimated coding bit cost is not greater than available coding bit limit (e.g., or less than, or less than or equal to, or the like), comparator module 103 may provide a signal to picture type and GOP structure based skip determination module 104. Picture type and GOP structure based skip determination module 104 may receive the signal from comparator module 103 and picture type and GOP structure based skip determination module 104 may determine, based on the picture type of the current picture and the structure of the GOP, a skip or non-skip signal (S/NS) 126 for the current picture based on a picture type of the current picture and a picture structure of the current group of picture (e.g., the group of pictures including the current picture).

Picture type and GOP structure based skip determination module 104 may provide skip or non-skip signal 126 to skip evaluation module 106 for the current picture. Skip evaluation module 106 may, when skip or non-skip signal 126 indicates skip for the current picture, provide a signal to skip picture coding module 105, which may, based on the signal, generate skip indicator 123 for the current picture and provide skip indicator 123 to entropy encoder 108 for entropy encoding and inclusion in bitstream 125 as discussed above.

When skip or non-skip signal 126 indicates non-skip for the current picture, skip evaluation module 106 may provide a signal to picture encode module 107, which may encode the current picture based on the received signal. Picture encode module 107 may encode the current picture using any suitable technique or techniques such as intra-prediction, inter-prediction, and the like to generate picture encode data (PED) 124. As shown, picture encode module 107 may provide picture encode data 124 to entropy encoder 108 for entropy encoding and inclusion in bitstream 125.

As discussed, picture type and GOP structure based skip determination module 104 may generate skip or non-skip signal 126 based on a picture type of the current picture and a picture structure of the group of pictures including the current picture. For example, the picture type of the current picture may include any suitable picture type based on the video coding standard being implemented. The picture type of the current picture may be defined by rate control module 101 and/or other modules of system 100 based on available picture types of the video coding standard being implemented and a variety of coding analysis, picture analysis, bitrate analysis, or the like. For example, the picture type may be I-picture (intra-picture; e.g., a picture predicted without reference to another picture), P-picture (predicted-picture; e.g., a picture predicted with reference to another picture or pictures and available for use in prediction of other pictures), B-picture (bi-directional-picture; e.g., predicted with reference to another picture or pictures and available for use in prediction of other pictures in some coding contexts but not available for use in prediction of other pictures in other coding contexts), hierarchical B-picture (e.g., a B-picture in a hierarchical B-picture coding context) including B0-, B-, B1-, and B-2 pictures, a picture having temporal scalability, or the like.

The picture structure may also include any suitable picture structure based on the video coding standard being implemented. For example, the picture structure may be a sequence of picture types, the types and ordering (e.g., in encode order and display order) of a group of pictures, or the like. The picture structure of a current group of pictures or video sequence or the like including the current picture may defined by rate control module 101 and/or other modules of system 100 based on available picture types of the video coding standard being implemented and a variety of coding analysis, picture analysis, bitrate analysis, or the like.

Picture type and GOP structure based skip determination module 104 may generate skip or non-skip signal 126 based on a picture type of the current picture and a picture structure of the group of pictures including the current picture using any suitable technique or techniques.

In some examples, determining skip or non-skip signal 126 (e.g., including a coding skip indicator for the current picture) may include determining, in an encode order of the group of pictures, an immediately prior encode picture to the current picture is of an equal or higher level picture and that the immediately prior encode picture is a skip picture. Based on the immediately prior encode picture being a skip picture and being an equal or higher level picture, the current picture may also be determined to be a skip picture (e.g., the coding skip indicator for the current picture may be set to skip via skip or non-skip signal 126 based on the immediately prior encode picture being a skip picture and being an equal or higher level picture).

Figure 2:
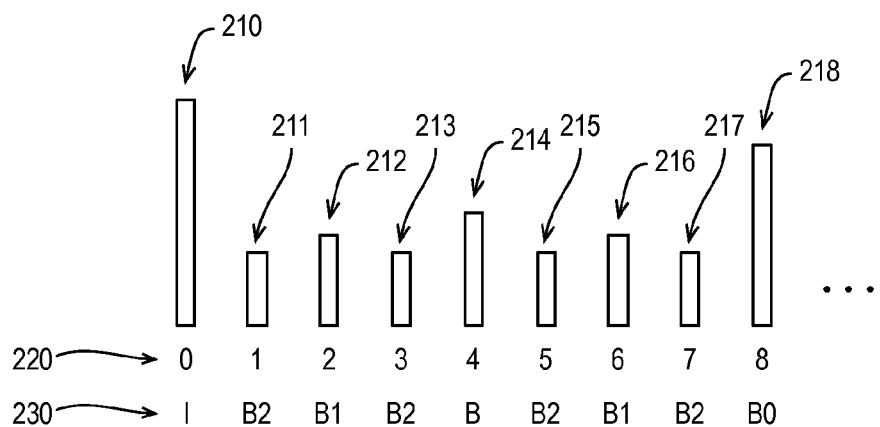
FIG. 2 illustrates an example group of pictures with hierarchical B-pictures.

FIG. 2 illustrates an example group of pictures 200 with hierarchical B-pictures, arranged in accordance with at least some implementations of the present disclosure. As shown in FIG. 2, group of pictures 200 may include pictures 210-218. In the illustrated example, group of pictures 200 may be a group of 8 pictures (e.g., GOP=8; not counting I-picture 210) in a display order 220 indicating that display order 220 (e.g., 0-8) follows in the order of picture 210, picture 211, picture 212, picture 213, picture 214, picture 215, picture 216, picture 217, and picture 218. Furthermore, group of pictures 200 may have picture types 230 such that picture 210 is an I-picture, picture 211 is a B2-picture, picture 212 is a B1-picture, picture 213 is a B2-picture, picture 214 is a B-picture, picture 215 is a B2-picture, picture 216 is a B1-picture, picture 217 is a B2-picture, and picture 218 is a B0-picture. For example, group of pictures 200 may be a group of pictures in an encoding context where hierarchical B-pictures are provided. In some examples, group of pictures 200 may be a group of pictures in a HEVC coding context. Although illustrated with particular details for the sake of clarity of presentation, group of pictures 200 may include any number of pictures of any suitable picture types in an suitable order.

As discussed, group of pictures 200 may have a display order 220 such that upon decode, pictures 210-218 may be decoded and displayed in display order 220. Furthermore, group of pictures 200 may have an encode order that may or may not match display order 220. In the example of FIG. 2, the hierarchy of group of pictures 200 may be I-, B0-, B-, B1-, B2- such that group of pictures 200 are encoded in order based on the hierarchy. For example, group of pictures 200 may have an encode order of: picture 210, picture 218, picture 214, picture 212, picture 211, picture 213, picture 216, picture 215 and picture 217 (e.g., 0, 8, 4, 2, 1, 3, 6, 5, 7).

As discussed with respect to FIG. 1, picture type and GOP structure based skip determination module 104 may set a skip indicator to skip for a current picture when, in an encode order, an immediately prior encode picture to the individual picture is an equal or higher level picture and is skip picture. It is noted that such processing may occur after processing via comparator module 103 (e.g., such that some pictures of group of pictures may be indicated as skip pictures based on available coding bit limit and estimated coding bit cost comparisons). For example, with reference to FIG. 2, if the current picture is picture 214 and picture 218 is the immediately prior encode picture such that picture 218 is an immediately prior encode picture of picture 214 having an equal or higher level picture, picture type and GOP structure based skip determination module 104 may determine if picture 218 is skip and, if so, provide a skip indicator for picture 214. For example, picture 218 may be an immediately prior encode picture (e.g., in an encode order) of picture 214, picture 218 may be an equal or higher level picture (e.g., B0 is a higher level than B), and, since picture 218 is a skip picture, picture 214 may also be determined to be a skip picture.

Similarly, with reference to FIG. 2, picture 212 may be provided a skip indicator if picture 214 is a skip picture (e.g., picture 214 is a higher level picture and immediately prior in encode order with respect to picture 212), picture 216 may be provided a skip indicator if picture 214 is a skip picture (e.g., picture 214 is the higher level picture and prior in encode order with respect to picture 216), picture 211 may be provided a skip indicator if picture 212 is a skip picture, picture 213 may be provided a skip indicator if picture 211 is a skip picture, picture 215 may be provided a skip indicator if picture 216 is a skip picture, picture 217 may be provided a skip indicator if picture 215 is a skip picture, and so on.

For example, FIG. 2 illustrates an example group of pictures 200 having a hierarchical B-picture structure. Such a coding context may be provided in HEVC or the like. In such examples, B-pictures of types B0, B, B1, and B2 may be available and a low level picture may include any B-picture having an immediately prior encode picture having an equal or higher level (e.g., B, B1, or B2).

In some contexts, hierarchical B-pictures may not be provided or available in an encode context. In such contexts, picture type and GOP structure based skip determination module 104 may set a skip indicator to skip for a current picture when, in an encode order, an immediately prior encode picture to the individual picture is an equal or higher level picture and is skip picture. For example, if the current picture is a B-picture and the immediately prior encode picture is a B-picture or a P-picture and is a skip picture, the current picture may set as a skip picture. Such a coding context (e.g., with I-, P-, and B-pictures available) may be provided in AVC or the like.

Figure 3:
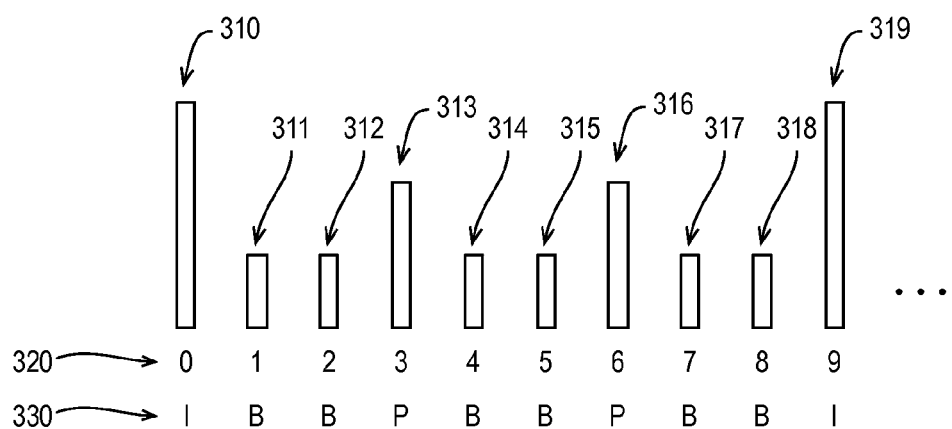
FIG. 3 illustrates an example group of pictures with I-, P-, and B-pictures.

FIG. 3 illustrates an example group of pictures 300 with I-, P-, and B-pictures, arranged in accordance with at least some implementations of the present disclosure. As shown in FIG. 3, group of pictures 300 may include pictures 310-319. In the illustrated example, group of pictures 300 may be a group of 9 pictures (e.g., GOP=9; not counting I-picture 310) in a display order 320 indicating that display order 320 (e.g., 0-9) follows in the order of picture 310, picture 311, picture 312, picture 313, picture 314, picture 315, picture 316, picture 317, picture 318, and picture 318. Furthermore, group of pictures 300 may have picture types 330 such that pictures 310 and 319 are I-pictures, pictures 313 and 316 are P-pictures, and pictures 311, 312, 314, 315, 317, and 319 are B-pictures. For example, group of pictures 200 may be a group of pictures in an encoding context where I-, P-, and B-pictures are provided. In some examples, group of pictures 300 may be a group of pictures an in AVC coding for example. Although illustrated with particular details for the sake of clarity of presentation, group of pictures 300 may include any suitable number of pictures of any suitable picture types in an suitable order.

As discussed, group of pictures 300 may have a display order 320 such that upon decode, pictures 310-319 may be decoded and displayed in display order 320. Group of pictures 300 may also have an encode order that may or may not match display order 320. In the example of FIG. 3, the hierarchy of group of pictures 200 may be I-, P-, B- such that group of pictures 300 are encoded in the following order: picture 310, picture 313, picture 311, picture 312, picture 316, picture 314, picture 315, picture 319, picture 317, and picture 318, although the order may vary depending on picture encode dependencies.

As discussed with respect to FIG. 1, picture type and GOP structure based skip determination module 104 may set a skip indicator to skip for a current picture when, in an encode order, an immediately prior encode picture to the individual picture is an equal or higher level picture and the immediately prior encode picture is a skip picture. It is noted that such processing may occur after processing via comparator module 103 (e.g., such that some pictures of group of pictures may be indicated as skip pictures based on available coding bit limit and estimated coding bit cost comparisons). For example, with reference to FIG. 3, if the current picture is picture 311 and picture 313 is the immediately prior encode picture having an equal or higher level picture, picture type and GOP structure based skip determination module 104 may determine if picture 313 is skip and, if so, provide a skip indicator for picture 311. For example, picture 313 may be an immediately prior encode picture (e.g., in an encode order) of picture 311, picture 313 may be an equal or higher level picture (e.g., P- is a higher level than B-), and since picture 313 is a skip picture, picture type and GOP structure based skip determination module 104 may set picture 311 to a skip picture. Similarly, with reference to FIG. 3, picture 312 may be provided a skip indicator if picture 311 is a skip picture (e.g., picture 311 is the same level picture and immediately prior in encode order with respect to picture 312), and so on.

For example, FIG. 3 illustrates an example group of pictures 300 having an I-, P-, B-picture structure. Such a coding context may be provided in AVC for the like. In such examples, B-pictures may be evaluated to determine if an immediately prior encode picture of equal or higher level picture is a skip picture and, if so, the current picture (e.g., the B-picture) may be a skip picture.

Returning to FIG. 1, in some examples, determining skip or non-skip signal 126 (e.g., including a coding skip indicator for the current picture) for a current picture may include determining the current picture is a first B-picture in a group of pictures and, in an encode order of the group of pictures, an immediately prior higher level picture is a non-skip picture. In such examples, the estimated coding bit cost (e.g., determined via rate control module 101) may be increased to generate an increased estimated coding bit cost and the coding skip indicator may be set to skip when the increased estimated coding bit cost is greater than the available coding bit limit. Such techniques may avoid a current B-picture is coded as non-skip and a subsequent B-picture is coded as skip, which may cause undesirable jitter or other artifacts.

For example, with reference to FIG. 3, picture type and GOP structure based skip determination module 104 may determine picture 311 is a first B-picture of group of pictures 300. Picture type and GOP structure based skip determination module 104 may also determine picture 313 (e.g., the immediately prior high level picture with respect to picture 311 in encode order) is a non-skip picture. Based on picture 311 being a first B-picture of group of pictures 300 and picture 313 being a non-skip picture, picture type and GOP structure based skip determination module 104 may send a signal to rate control module 101 to increase the estimated coding bit cost associated with picture 311 (e.g., based on Equation (2) or the like) to generate an increased estimated coding bit cost. The increased estimated coding bit cost may be compared to the available coding bit limit for picture 311 (e.g., based on Equation (1) or the like) and, as discussed, if the increased estimated coding bit cost is greater than the available coding bit limit, the coding skip indicator may be set to skip for the current picture. Such operations may be performed via comparator module 103 and skip picture coding module 105 as discussed herein.

The increased estimated coding bit cost may be generated using any suitable technique or techniques. In some examples, the increased estimated coding bit cost for the current picture may be the estimated coding bit cost for the picture adjusted by (e.g., either by addition or multiplication or the like) a coding cost increase factor or parameter or the like. In some examples, the increased estimated coding bit cost for the current picture may be the estimated coding bit cost for the picture multiplied by a coding cost increase factor or parameter or the like. For example, increased estimated coding bit cost may be generated as shown in Equation (3):

$$IncEstBits[N]=EstBits[N]*F \qquad (3)$$

where IncEstBits[N] may be the increased estimated coding bit cost, EstBits may be the estimated coding bit cost, N may indicate the current picture, and F may be a coding cost increase factor, parameter, or the like. F may be any suitable value such as 1.3 to 1.5 or the like.

Returning to FIG. 1, in some examples, determining skip or non-skip signal 126 for a current picture (e.g., including a coding skip indicator for the current picture) may include determining a higher level picture of the group of pictures is a skip picture, determining, in a display order of the group of pictures, the current picture is prior to the higher level picture and subsequent to another higher level picture, and determining the current picture is a skip picture (e.g., setting the coding skip indicator to skip) based on the higher level picture comprising a skip picture and the position of the current picture between the higher level pictures.

For example, with reference to FIG. 2, if the current picture is picture 213, picture type and GOP structure based skip determination module 104 may determine picture 214 (e.g., a B-picture being a higher level picture than a B2-picture) is a skip picture. Furthermore, picture type and GOP structure based skip determination module 104 may determine picture 213 is prior to, in display order 220, picture 214 and that picture 213 is subsequent to, in display order 220, another higher level picture, picture 212 (e.g., an B1-picture being a higher level picture than a B2-picture). Based on picture 214 being a skip picture and picture 213 being prior to picture 214 and subsequent to picture 210, a coding skip indicator may be set to skip for picture 213.

Similarly, continuing the example of picture 214 being a skip picture, pictures 211-213 may be set to skip based on picture 214 being a skip picture, picture 214 having a higher level than pictures 211-213, and pictures 211-213 being prior to picture 214 and subsequent to picture 210 (e.g., picture 210 also having a higher level than pictures 211-213). Furthermore, if picture 212 is a skip picture, picture 211 may be set to skip (e.g., picture 211 being prior to higher level picture 212 and subsequent to another higher level picture 210). Similarly, if picture 218 is a skip picture, pictures 211-217 may be determined to be skip pictures. In another example, if picture 216 is a skip picture, picture 215 may be determined to be a skip picture. It is noted that if picture 215 is a skip picture, no change to picture 214 is provided as picture 214 is a higher level than picture 215.

Similarly, if picture 216 is a skip picture, no change to picture 214 is provided as picture 214 is a higher level than picture 216.

With reference to FIG. 3, if the current picture is picture 312, GOP structure based skip determination module 104 may determine picture 313 (e.g., a P-picture being a higher level picture than a B2-picture) is a skip picture. Furthermore, picture type and GOP structure based skip determination module 104 may determine picture 312 is prior to, in display order, picture 313 and that picture 312 is subsequent to, in display order, another higher level picture, picture 310 (e.g., an I-picture being a higher level picture than a B-picture). Based on picture 313 being a skip picture and picture 312 being prior to picture 313 and subsequent to picture 310, a coding skip indicator may be set to skip for picture 312.

Similarly, continuing the example of picture 313 being a skip picture, pictures 311 and 312 may be set to skip based on picture 313 being a skip picture, picture 313 having a higher level than pictures 311 and 312, and pictures 311 and 312 being prior to picture 313 and subsequent to picture 310 (e.g., picture 310 also having a higher level than pictures 311 and 312). Furthermore, if picture 316 is a skip picture, pictures 314 and 315 may be set to skip (e.g., pictures 314 and 315 being prior to higher level picture 316 and subsequent to another higher level picture 313). It is noted that if picture 315 is a skip picture, no change to picture 314 nor 313 may be provided since picture 314 has the same level than picture 315 and picture 313 is a higher level picture.

Returning to FIG. 1, in some examples, system 100 may perform coding with temporal scalability. In such examples, determining skip or non-skip signal 126 (e.g., including a coding skip indicator for the current picture) via GOP structure based skip determination module 104 may include determining the current picture is a low level temporal scalability picture, determining a higher level temporal scalability picture of the group of pictures is a skip picture, determining, in a display order of the group of pictures, the current picture is prior to the higher level temporal scalability picture and subsequent to a second higher level temporal scalability picture, and setting the coding skip indicator to skip based on the higher level temporal scalability picture comprising a skip picture.

Figure 4:
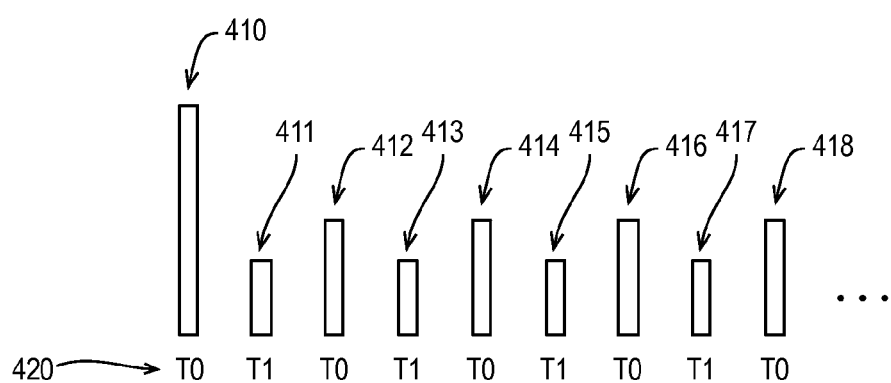
FIG. 4 illustrates an example group of pictures with temporal scalability.

FIG. 4 illustrates an example group of pictures 400 with temporal scalability, arranged in accordance with at least some implementations of the present disclosure. As shown in FIG. 4, group of pictures 400 may include pictures 410-418. In the illustrated example, group of pictures 400 may be a group of 8 pictures (e.g., GOP=8; not counting I-picture 410) with pictures 410, 412, 414, 416, and 418 having a high or higher or enhanced temporal scalability (e.g., a lower QP value and a higher bit allocation) and pictures 411, 413, 415, and 417 having a low or lower level or decreased temporal scalability. For example, pictures 410, 412, 414, 416, and 418 may have a picture type 420 (e.g., labeled T0) of high temporal scalability level with respect to pictures 411, 413, 415, and 417 and pictures 411, 413, 415, and 417 may have a picture type 420 (e.g., labeled T1) of have a low temporal scalability level with respect to pictures 410, 412, 414, 416, and 418. For example, pictures 411, 413, 415, and 417 may be low or lower level or decreased temporal scalability pictures having a higher QP value and lower bit allocation. Group of pictures 400 may have any number of temporal scalability levels such as three levels as illustrated (e.g. with picture 410 having a highest level, pictures 412, 414, 416, and 418 having a high or medium level, and pictures 411, 413, 415, and 417 having a low or lowest level), two levels, four levels, or the like. Although illustrated with particular details for the sake of clarity of presentation, group of pictures 200 may include any suitable group of picture types in an suitable order. Such levels and the distribution across group of pictures 400 may be predefined or determined via system 100 during coding or the like.

As discussed, in coding contexts with temporal scalability determining skip or non-skip signal 126 (e.g., including a coding skip indicator for the current picture) for a current picture may include determining the current picture is a low level temporal scalability picture and determining a higher level temporal scalability picture of the group of pictures is a skip picture. For example, with respect to FIG. 4, if the current picture is picture 413, picture type and GOP structure based skip determination module 104 may determine picture 413 is a low temporal scalability picture and picture 412 is a skip picture (e.g., picture 412 may be a higher level temporal scalability picture with respect to picture 413). Furthermore, picture type and GOP structure based skip determination module 104 may determine picture 413 is subsequent to, in display order, picture 412. Based on picture 412 being a skip picture and picture 413 being subsequent to picture 412, a coding skip indicator may be set to skip for picture 413.

Returning to FIG. 1, in some examples, system 100 may perform coding with interlaced video. For example, interlaced coding or interlaced video may provide for increasing a perceived frame rate of video by interlacing two fields of a picture captured at different times. For example, interlaced coding may include coding two pictures or two fields that, when combined, constitute a single picture. Such coding may be provided in interlaced video contexts for example. In such examples, a current picture of video 121 may be an interlaced field (e.g., with half the resolution of a full picture) of an interlaced coded picture (e.g., with full resolution such that the interlaced coded picture is made up of two interlaced pictures or fields). In some examples, such a picture may be characterized as a field or an interlaced field or the like. In such examples, if the current picture is an interlaced picture, the current picture may be set to a skip picture if the other interlaced picture is a skip picture. For example, GOP structure based skip determination module 104 may set a coding skip indicator to skip for a current interlaced picture based on the other interlaced picture being a skip picture or field. For example, it may be undesirable to skip one field of an interlaced picture and not skip the other field as such coding may cause jitter and/or other artifacts.

The techniques discussed herein may provide for low and/or extremely low bitrate coding with relatively high quality and without undesirable artifacts such as jitter artifacts or the like. Furthermore, such techniques may be implemented in a single-pass and may therefore be suitable for hardware implementation. The described techniques may generate an encoded bitstream such as bitstream 125 coded with picture level skip decisions and, for those pictures that are non-skip, picture encode data such as picture encode data 124.

Figure 5:
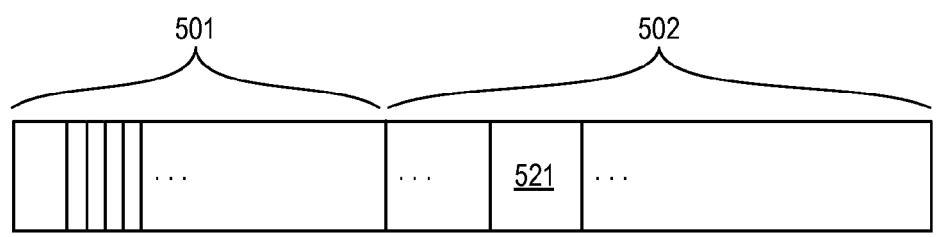
FIG. 5 illustrates an example bitstream.

FIG. 5 illustrates an example bitstream 500, arranged in accordance with at least some implementations of the present disclosure. In some examples, bitstream 500 may correspond to bitstream 125 as shown in FIG. 1. As shown in FIG. 5, in some examples, bitstream 500 may include a header portion 501 and a data portion 502. In some examples, picture level skip indicators including indicators or flags or bits or the like indicating whether or not to perform coding (e.g., decoding) for particular pictures of video may be provided via bitstream 500. For example, skip indicator 123 for a particular picture of video may be provided via bitstream 500. Furthermore, data portion 502 may include encoded picture data 521 for coded pictures. For example, encoded picture data 521 may include picture encode data 124 or the like. Such encoded picture data 521 may include, for example, encoded quantized transform coefficients, encoded motion vector data, encoded picture reconstruction data, or the like.

Figure 6:
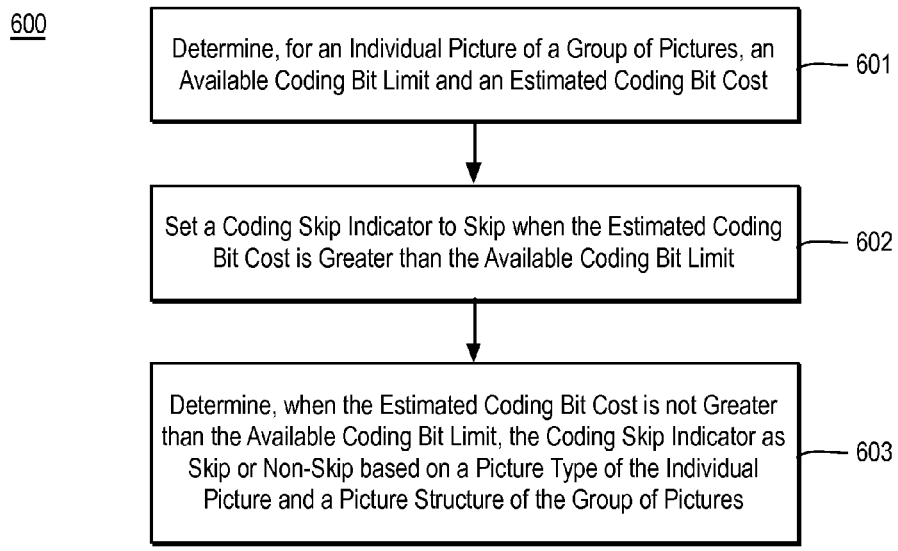
FIG. 6 is a flow diagram illustrating an example process for video coding with picture level skip coding.

FIG. 6 is a flow diagram illustrating an example process 600 for video coding with picture level skip coding, arranged in accordance with at least some implementations of the present disclosure. Process 600 may include one or more operations 601-603 as illustrated in FIG. 6. Process 600 may form at least part of a video coding process. By way of non-limiting example, process 600 may form at least part of a video coding process as performed by any device or system as discussed herein such as system 100. Furthermore, process 600 will be described herein with reference to system 700 of FIG. 7.

Figure 7:
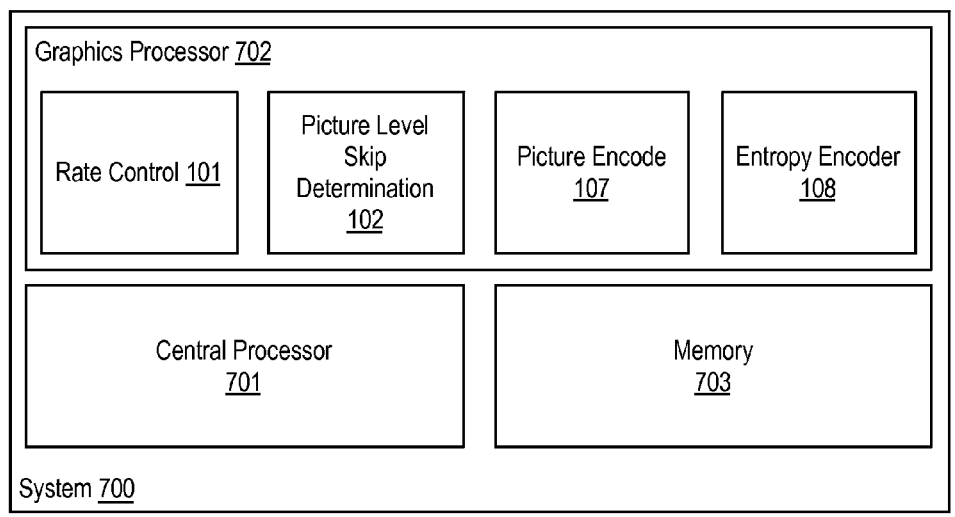
FIG. 7 is an illustrative diagram of an example system for video coding with picture level skip coding.

FIG. 7 is an illustrative diagram of an example system 700 for video coding with picture level skip coding, arranged in accordance with at least some implementations of the present disclosure. As shown in FIG. 7, system 700 may include central processor 701, a graphics processor 702, and memory 703. Also as shown, graphics processor 702 may include rate control module 101, picture level skip determination module 102, picture encode module 107, and entropy encoder 108. In the example of system 700, memory 703 may store video data or related content such as video, video data, picture data, frame data, group or picture data, picture type data, available coding bit limits, estimated coding bit costs, increased estimated coding bit costs, picture level skip data, skip indicators, skip or non-skip signal data, picture encode data, bitstream data, control data, and/or any other data as discussed herein.

As shown, in some examples, rate control module 101, picture level skip determination module 102, picture encode module 107, and entropy encoder 108 may be implemented via graphics processor 702. In other examples, one or more or portions of rate control module 101, picture level skip determination module 102, picture encode module 107, and entropy encoder 108 may be implemented via central processor 701, or another processing unit such as an image processor, an image processing pipeline, or the like.

Graphics processor 702 may include any number and type of graphics processing units that may provide the operations as discussed herein. Such operations may be implemented via software or hardware or a combination thereof. For example, graphics processor 702 may include circuitry dedicated to manipulate pictures, picture data, or the like obtained from memory 703. Central processor 701 may include any number and type of processing units or modules that may provide control and other high level functions for system 700 and/or provide any operations as discussed herein. Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

In an embodiment, one or more or portions of rate control module 101, picture level skip determination module 102, picture encode module 107, and entropy encoder 108 may be implemented via an execution unit (EU) of graphics processor 702. The EU may include, for example, programmable logic or circuitry such as a logic core or cores that may provide a wide array of programmable logic functions.

In an embodiment, one or more or portions of rate control module 101, picture level skip determination module 102, picture encode module 107, and entropy encoder 108 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 may begin at operation 601, "Determine, for an Individual Picture of a Group of Pictures, an Available Coding Bit Limit and an Estimated Coding Bit Cost", where, for an individual picture of a group of pictures, an available coding bit limit and an estimated coding bit cost may be determined. For example, rate control module 101 as implemented via graphics processor 702 may determine the available coding bit limit and the estimated coding bit cost for the individual picture. The available coding bit limit may be determined using any suitable technique or techniques. In some examples, the available coding bit limit may be a sum of a hypothetical reference decoder buffer fullness associated with an immediately prior encode picture and an average target rate for each picture of the group of pictures. Furthermore, the estimated coding bit cost may be determined using any suitable technique or techniques. In some examples, the estimated coding bit cost may be a product of an actual coding bit cost of a prior encode picture, a ratio of a distortion of the individual picture to a distortion of the prior picture, and a ratio of a quantization parameter associated with the prior picture to a maximum quantization parameter. For example, the individual picture and the prior picture may be the same picture type.

Processing may continue at operation 602, "Set a Coding Skip Indicator to Skip when the Estimated Coding Bit Cost is Greater than the Available Coding Bit Limit", where a coding skip indicator may be set to skip for the individual picture when the estimated coding bit cost is greater than the available coding bit limit. For example, picture level skip determination module 102 may set a coding skip indicator for the individual picture to skip based on the estimated coding bit cost being greater than the available coding bit limit.

Processing may continue at operation 603, "Determine, when the Estimated Coding Bit Cost is not Greater than the Available Coding Bit Limit, the Coding Skip Indicator as Skip or Non-Skip based on a Picture Type of the Individual Picture and a Picture Structure of the Group of Pictures", where, when the estimated coding bit cost is not greater than the available coding bit limit, the coding skip indicator may be determined as skip or non-skip based on a picture type of the individual picture and a picture structure of the group of pictures. For example, picture level skip determination module 102 may determine the coding skip indicator is skip or non-skip based on the picture type of the individual picture and the picture structure of the group of pictures. The coding skip indicator may determined based on the picture type of the individual picture and the picture structure using any suitable technique or techniques.

In some examples, determining the coding skip indicator based on the picture type of the individual picture and the picture structure of the group of pictures may include determining, in an encode order of the group of pictures, an immediately prior encode picture to the individual picture is at least one of an equal or higher level picture and the immediately prior encode picture comprises a skip picture and setting the coding skip indicator to skip based on the immediately prior encode picture comprising a skip picture.

In some examples, the video coding may be advanced video coding (AVC) based video coding and the individual picture may be a B-picture. In some examples, the video coding may be high efficiency video coding (HEVC) based video coding and the individual picture may be a low level B-picture.

In some examples, the individual picture may be, in an encode order of the group of pictures, a first B-picture and determining the coding skip indicator based on the picture type of the individual picture and the picture structure of the group of pictures may include determining, in the encode order of the group of pictures, an immediately prior higher level picture to the individual picture comprises a non-skip picture, increasing the estimated coding bit cost to generate an increased estimated coding bit cost, and setting the coding skip indicator to skip when the increased estimated coding bit cost is greater than the available coding bit limit.

In some examples, determining the coding skip indicator based on the picture type of the individual picture and the picture structure of the group of pictures may include determining a higher level picture of the group of pictures comprises a skip picture, determining, in a display order of the group of pictures, the individual picture is prior to the higher level picture and subsequent to a second higher level picture, and setting the coding skip indicator to skip based on the higher level picture comprising a skip picture. For example, the video coding may be advanced video coding (AVC) based video coding or high efficiency video coding (HEVC) based video coding and the individual picture may be a B-picture.

In some examples, the video coding may include temporal scalability, the individual picture may be a low level temporal scalability picture, and determining the coding skip indicator based on the picture type of the individual picture and the picture structure of the group of pictures may include determining a higher level temporal scalability picture of the group of pictures is a skip picture, determining, in a display order of the group of pictures, the individual picture is prior to the higher level temporal scalability picture and subsequent to a second higher level temporal scalability picture, and setting the coding skip indicator to skip based on the higher level temporal scalability picture comprising a skip picture.

In some examples, the individual picture may be an interlaced field of an interlaced coded picture, a second interlaced field of the interlaced coded picture may be a skip field, and determining the coding skip indicator based on the picture type of the individual picture and the picture structure of the group of pictures may include setting the coding skip indicator to skip based on the second interlaced field comprising a skip field.

Process 600 may be repeated any number of times either in series or in parallel for any number pictures or groups of pictures or the like. As discussed, process 600 may provide for video encoding with picture level skip coding. For example, the discussed techniques for video coding may provide computationally efficient, low power video coding with relatively high quality and low levels of artifacts such as jitter artifacts.

Various components of the systems described herein may be implemented in software, firmware, and/or hardware and/or any combination thereof. For example, various components of system 100, system 700, system 800, or device 900 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of process 600 or any operations discussed herein and/or any portions of system 100, system 800, device 900, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
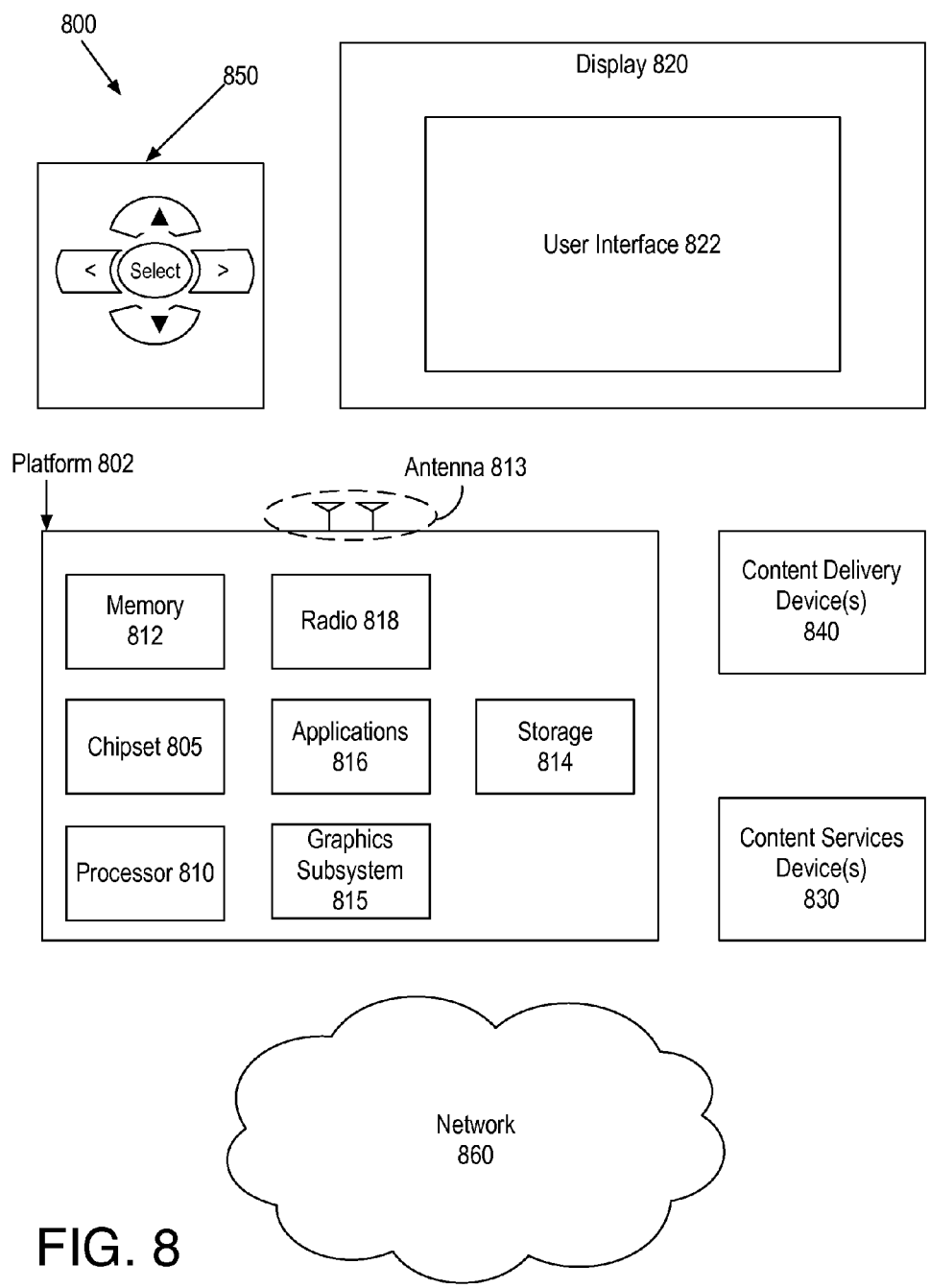
FIG. 8 is an illustrative diagram of an example system.

FIG. 8 is an illustrative diagram of an example system 800, arranged in accordance with at least some implementations of the present disclosure. In various implementations, system 800 may be a mobile system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of may be used to interact with user interface 822, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 820) by movements of a pointer, cursor, focus ring, or other visual indicators displayed on the display. For example, under the control of software applications 816, the navigation features located on navigation may be mapped to virtual navigation features displayed on user interface 822, for example. In various embodiments, may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
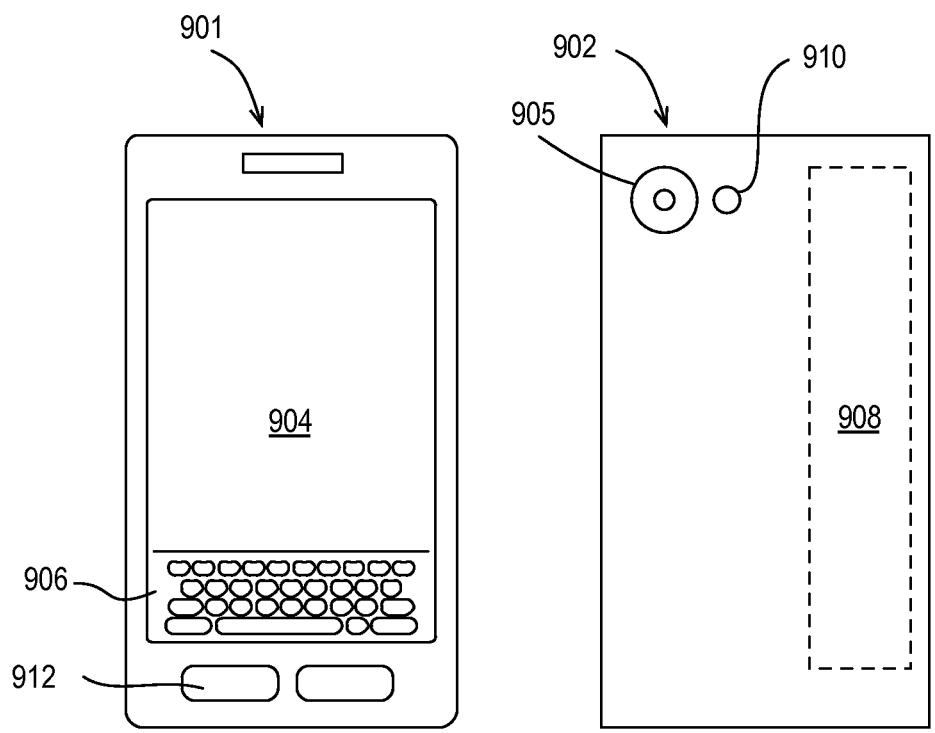
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 1000 may be implemented via device 900. In other examples, system 100 or portions thereof may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video coding comprises determining, for an individual picture of a group of pictures, an available coding bit limit and an estimated coding bit cost, setting a coding skip indicator to skip for the individual picture when the estimated coding bit cost is greater than the available coding bit limit, and determining, when the estimated coding bit cost is not greater than the available coding bit limit, the coding skip indicator as skip or non-skip based on a picture type of the individual picture and a picture structure of the group of pictures.

Further to the first embodiments, determining the coding skip indicator based on the picture type of the individual picture and the picture structure of the group of pictures comprises determining, in an encode order of the group of pictures, an immediately prior encode picture to the individual picture comprises at least one of an equal or higher level picture and the immediately prior encode picture comprises a skip picture and setting the coding skip indicator to skip based on the immediately prior encode picture comprising a skip picture.

Further to the first embodiments, determining the coding skip indicator based on the picture type of the individual picture and the picture structure of the group of pictures comprises determining, in an encode order of the group of pictures, an immediately prior encode picture to the individual picture comprises at least one of an equal or higher level picture and the immediately prior encode picture comprises a skip picture and setting the coding skip indicator to skip based on the immediately prior encode picture comprising a skip picture, wherein the video coding comprises advanced video coding (AVC) based video coding and the individual picture comprises a B-picture.

Further to the first embodiments, determining the coding skip indicator based on the picture type of the individual picture and the picture structure of the group of pictures comprises determining, in an encode order of the group of pictures, an immediately prior encode picture to the individual picture comprises at least one of an equal or higher level picture and the immediately prior encode picture comprises a skip picture and setting the coding skip indicator to skip based on the immediately prior encode picture comprising a skip picture, wherein the video coding comprises high efficiency video coding (HEVC) based video coding and the individual picture comprises a low level B-picture.

Further to the first embodiments, determining the coding skip indicator based on the picture type of the individual picture and the picture structure of the group of pictures comprises determining, in an encode order of the group of pictures, an immediately prior encode picture to the individual picture comprises at least one of an equal or higher level picture and the immediately prior encode picture comprises a skip picture and setting the coding skip indicator to skip based on the immediately prior encode picture comprising a skip picture, wherein the video coding comprises advanced video coding (AVC) based video coding and the individual picture comprises a B-picture or the video coding comprises high efficiency video coding (HEVC) based video coding and the individual picture comprises a low level B-picture.

Further to the first embodiments, the individual picture comprises, in an encode order of the group of pictures, a first B-picture and determining the coding skip indicator based on the picture type of the individual picture and the picture structure of the group of pictures comprises determining, in the encode order of the group of pictures, an immediately prior higher level picture to the individual picture comprises a non-skip picture, increasing the estimated coding bit cost to generate an increased estimated coding bit cost, and setting the coding skip indicator to skip when the increased estimated coding bit cost is greater than the available coding bit limit.

Further to the first embodiments, determining the coding skip indicator based on the picture type of the individual picture and the picture structure of the group of pictures comprises determining a higher level picture of the group of pictures comprises a skip picture, determining, in a display order of the group of pictures, the individual picture is prior to the higher level picture and subsequent to a second higher level picture, and setting the coding skip indicator to skip based on the higher level picture comprising a skip picture.

Further to the first embodiments, determining the coding skip indicator based on the picture type of the individual picture and the picture structure of the group of pictures comprises determining a higher level picture of the group of pictures comprises a skip picture, determining, in a display order of the group of pictures, the individual picture is prior to the higher level picture and subsequent to a second higher level picture, and setting the coding skip indicator to skip based on the higher level picture comprising a skip picture, wherein the video coding comprises at least one of advanced video coding (AVC) based video coding or comprises high efficiency video coding (HEVC) based video coding and the individual picture comprises a B-picture.

Further to the first embodiments, the video coding comprises temporal scalability, the individual picture comprises a low level temporal scalability picture, and determining the coding skip indicator based on the picture type of the individual picture and the picture structure of the group of pictures comprises determining a higher level temporal scalability picture of the group of pictures is a skip picture, determining, in a display order of the group of pictures, the individual picture is prior to the higher level temporal scalability picture and subsequent to a second higher level temporal scalability picture, and setting the coding skip indicator to skip based on the higher level temporal scalability picture comprising a skip picture.

Further to the first embodiments, the individual picture comprises an interlaced field of an interlace coded picture, a second interlaced field of the interlace coded picture comprises a skip field, and determining the coding skip indicator based on the picture type of the individual picture and the picture structure of the group of pictures comprises setting the coding skip indicator to skip based on the second interlaced field comprising a skip field.

Further to the first embodiments, the available coding bit limit comprises a sum of a hypothetical reference decoder buffer fullness associated with an immediately prior encode picture and an average target rate for each picture of the group of pictures.

Further to the first embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

Further to the first embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter, wherein the individual picture and the prior picture comprise the same picture type.

Further to the first embodiments, the available coding bit limit comprises a sum of a hypothetical reference decoder buffer fullness associated with an immediately prior encode picture and an average target rate for each picture of the group of pictures and/or the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

In one or more second embodiments, a system for video encoding comprises a memory to store a group of pictures and a graphics processor coupled to the memory, the graphics processor to determine, for an individual picture of the group of pictures, an available coding bit limit and an estimated coding bit cost, set a coding skip indicator to skip for the individual picture when the estimated coding bit cost is greater than the available coding bit limit, and determine, when the estimated coding bit cost is not greater than the available coding bit limit, the coding skip indicator as skip or non-skip based on a picture type of the individual picture and a picture structure of the group of pictures.

Further to the second embodiments, the graphics processor to determine the coding skip indicator based on the picture type of the individual picture and the picture structure of the group of pictures comprises the graphics processor to determine, in an encode order of the group of pictures, an immediately prior encode picture to the individual picture comprises at least one of an equal or higher level picture and the immediately prior encode picture comprises a skip picture, and set the coding skip indicator to skip based on the immediately prior encode picture comprising a skip picture.

Further to the second embodiments, the graphics processor to determine the coding skip indicator based on the picture type of the individual picture and the picture structure of the group of pictures comprises the graphics processor to determine, in an encode order of the group of pictures, an immediately prior encode picture to the individual picture comprises at least one of an equal or higher level picture and the immediately prior encode picture comprises a skip picture, and set the coding skip indicator to skip based on the immediately prior encode picture comprising a skip picture, wherein the video coding comprises advanced video coding (AVC) based video coding and the individual picture comprises a B-picture.

Further to the second embodiments, the graphics processor to determine the coding skip indicator based on the picture type of the individual picture and the picture structure of the group of pictures comprises the graphics processor to determine, in an encode order of the group of pictures, an immediately prior encode picture to the individual picture comprises at least one of an equal or higher level picture and the immediately prior encode picture comprises a skip picture, and set the coding skip indicator to skip based on the immediately prior encode picture comprising a skip picture, wherein the video coding comprises high efficiency video coding (HEVC) based video coding and the individual picture comprises a low level B-picture.

Further to the second embodiments, the individual picture comprises, in an encode order of the group of pictures, a first B-picture and the graphics processor to determine the coding skip indicator based on the picture type of the individual picture and the picture structure of the group of pictures comprises the graphics processor to determine, in the encode order of the group of pictures, an immediately prior higher level picture to the individual picture comprises a non-skip picture, increase the estimated coding bit cost to generate an increased estimated coding bit cost, and set the coding skip indicator to skip when the increased estimated coding bit cost is greater than the available coding bit limit.

Further to the second embodiments, the graphics processor to determine the coding skip indicator based on the picture type of the individual picture and the picture structure of the group of pictures comprises the graphics processor to determine a higher level picture of the group of pictures comprises a skip picture, determine, in a display order of the group of pictures, the individual picture is prior to the higher level picture and subsequent to a second higher level picture, and set the coding skip indicator to skip based on the higher level picture comprising a skip picture.

Further to the second embodiments, the graphics processor to determine the coding skip indicator based on the picture type of the individual picture and the picture structure of the group of pictures comprises the graphics processor to determine a higher level picture of the group of pictures comprises a skip picture, determine, in a display order of the group of pictures, the individual picture is prior to the higher level picture and subsequent to a second higher level picture, and set the coding skip indicator to skip based on the higher level picture comprising a skip picture, wherein the video coding comprises at least one of advanced video coding (AVC) based video coding or comprises high efficiency video coding (HEVC) based video coding and the individual picture comprises a B-picture.

Further to the second embodiments, the video coding comprises temporal scalability, the individual picture comprises a low level temporal scalability picture, and the graphics processor to determine the coding skip indicator based on the picture type of the individual picture and the picture structure of the group of pictures comprises the graphics processor to determine a higher level temporal scalability picture of the group of pictures is a skip picture, determine, in a display order of the group of pictures, the individual picture is prior to the higher level temporal scalability picture and subsequent to a second higher level temporal scalability picture, and set the coding skip indicator to skip based on the higher level temporal scalability picture comprising a skip picture.

Further to the second embodiments, the individual picture comprises an interlaced field of an interlace coded picture, a second interlaced field of the interlace coded picture comprises a skip field, and the graphics processor to determine the coding skip indicator based on the picture type of the individual picture and the picture structure of the group of pictures comprises the graphics processor to set the coding skip indicator to skip based on the second interlaced field comprising a skip field.

Further to the second embodiments, the available coding bit limit comprises a sum of a hypothetical reference decoder buffer fullness associated with an immediately prior encode picture and an average target rate for each picture of the group of pictures.

Further to the second embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

Further to the second embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter, wherein the individual picture and the prior picture comprise the same picture type.

Further to the second embodiments, the available coding bit limit comprises a sum of a hypothetical reference decoder buffer fullness associated with an immediately prior encode picture and an average target rate for each picture of the group of pictures and the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

In one or more third embodiments, a system for video coding comprises means for determining, for an individual picture of a group of pictures, an available coding bit limit and an estimated coding bit cost, means for setting a coding skip indicator to skip for the individual picture when the estimated coding bit cost is greater than the available coding bit limit, and means for determining, when the estimated coding bit cost is not greater than the available coding bit limit, the coding skip indicator as skip or non-skip based on a picture type of the individual picture and a picture structure of the group of pictures.

Further to the third embodiments, the means for determining the coding skip indicator based on the picture type of the individual picture and the picture structure of the group of pictures comprise means for determining, in an encode order of the group of pictures, an immediately prior encode picture to the individual picture comprises at least one of an equal or higher level picture and the immediately prior encode picture comprises a skip picture and means for setting the coding skip indicator to skip based on the immediately prior encode picture comprising a skip picture.

Further to the third embodiments, the means for determining the coding skip indicator based on the picture type of the individual picture and the picture structure of the group of pictures comprise means for determining, in an encode order of the group of pictures, an immediately prior encode picture to the individual picture comprises at least one of an equal or higher level picture and the immediately prior encode picture comprises a skip picture and means for setting the coding skip indicator to skip based on the immediately prior encode picture comprising a skip picture, wherein the video coding comprises advanced video coding (AVC) based video coding and the individual picture comprises a B-picture.

Further to the third embodiments, the means for determining the coding skip indicator based on the picture type of the individual picture and the picture structure of the group of pictures comprise means for determining, in an encode order of the group of pictures, an immediately prior encode picture to the individual picture comprises at least one of an equal or higher level picture and the immediately prior encode picture comprises a skip picture and means for setting the coding skip indicator to skip based on the immediately prior encode picture comprising a skip picture, wherein the video coding comprises high efficiency video coding (HEVC) based video coding and the individual picture comprises a low level B-picture.

Further to the third embodiments, the individual picture comprises, in an encode order of the group of pictures, a first B-picture and the means for determining the coding skip indicator based on the picture type of the individual picture and the picture structure of the group of pictures comprise means for determining, in the encode order of the group of pictures, an immediately prior higher level picture to the individual picture comprises a non-skip picture, means for increasing the estimated coding bit cost to generate an increased estimated coding bit cost, and means for setting the coding skip indicator to skip when the increased estimated coding bit cost is greater than the available coding bit limit.

Further to the third embodiments, the means for determining the coding skip indicator based on the picture type of the individual picture and the picture structure of the group of pictures comprise means for determining a higher level picture of the group of pictures comprises a skip picture, means for determining, in a display order of the group of pictures, the individual picture is prior to the higher level picture and subsequent to a second higher level picture, and means for setting the coding skip indicator to skip based on the higher level picture comprising a skip picture.

Further to the third embodiments, the means for determining the coding skip indicator based on the picture type of the individual picture and the picture structure of the group of pictures comprise means for determining a higher level picture of the group of pictures comprises a skip picture, means for determining, in a display order of the group of pictures, the individual picture is prior to the higher level picture and subsequent to a second higher level picture, and means for setting the coding skip indicator to skip based on the higher level picture comprising a skip picture, wherein the video coding comprises at least one of advanced video coding (AVC) based video coding or high efficiency video coding (HEVC) based video coding and the individual picture comprises a B-picture.

Further to the third embodiments, the video coding comprises temporal scalability, the individual picture comprises a low level temporal scalability picture, and the means for determining the coding skip indicator based on the picture type of the individual picture and the picture structure of the group of pictures comprise means for determining a higher level temporal scalability picture of the group of pictures is a skip picture, means for determining, in a display order of the group of pictures, the individual picture is prior to the higher level temporal scalability picture and subsequent to a second higher level temporal scalability picture, and means for setting the coding skip indicator to skip based on the higher level temporal scalability picture comprising a skip picture.

Further to the third embodiments, the individual picture comprises an interlaced field of an interlaced coded picture, a second interlaced field of the interlaced coded picture comprises a skip field, and the means for determining the coding skip indicator based on the picture type of the individual picture and the picture structure of the group of pictures comprises means for setting the coding skip indicator to skip based on the second interlaced field comprising a skip field.

Further to the third embodiments, the available coding bit limit comprises a sum of a hypothetical reference decoder buffer fullness associated with an immediately prior encode picture and an average target rate for each picture of the group of pictures.

Further to the third embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

Further to the third embodiments, the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter, wherein the individual picture and the prior picture comprise the same picture type.

In one or more fourth embodiments, at least one machine readable medium comprises a plurality of instructions that in response to being executed on a computing device, cause the computing device to perform video coding by determining, for an individual picture of a group of pictures, an available coding bit limit and an estimated coding bit cost, setting a coding skip indicator to skip for the individual picture when the estimated coding bit cost is greater than the available coding bit limit, and determining, when the estimated coding bit cost is not greater than the available coding bit limit, the coding skip indicator as skip or non-skip based on a picture type of the individual picture and a picture structure of the group of pictures.

Further to the fourth embodiments, determining the coding skip indicator based on the picture type of the individual picture and the picture structure of the group of pictures comprises determining, in an encode order of the group of pictures, an immediately prior encode picture to the individual picture comprises at least one of an equal or higher level picture and the immediately prior encode picture comprises a skip picture and setting the coding skip indicator to skip based on the immediately prior encode picture comprising a skip picture.

Further to the fourth embodiments, the individual picture comprises, in an encode order of the group of pictures, a first B-picture and determining the coding skip indicator based on the picture type of the individual picture and the picture structure of the group of pictures comprises determining, in the encode order of the group of pictures, an immediately prior higher level picture to the individual picture comprises a non-skip picture, increasing the estimated coding bit cost to generate an increased estimated coding bit cost, and setting the coding skip indicator to skip when the increased estimated coding bit cost is greater than the available coding bit limit.

Further to the fourth embodiments, determining the coding skip indicator based on the picture type of the individual picture and the picture structure of the group of pictures comprises determining a higher level picture of the group of pictures comprises a skip picture, determining, in a display order of the group of pictures, the individual picture is prior to the higher level picture and subsequent to a second higher level picture, and setting the coding skip indicator to skip based on the higher level picture comprising a skip picture.

Further to the fourth embodiments, the video coding comprises temporal scalability, the individual picture comprises a low level temporal scalability picture, and determining the coding skip indicator based on the picture type of the individual picture and the picture structure of the group of pictures comprises determining a higher level temporal scalability picture of the group of pictures is a skip picture, determining, in a display order of the group of pictures, the individual picture is prior to the higher level temporal scalability picture and subsequent to a second higher level temporal scalability picture, and setting the coding skip indicator to skip based on the higher level temporal scalability picture comprising a skip picture.

Further to the fourth embodiments, the individual picture comprises an interlaced field of an interlaced coded picture, a second interlaced field of the interlaced coded picture comprises a skip field, and determining the coding skip indicator based on the picture type of the individual picture and the picture structure of the group of pictures comprises setting the coding skip indicator to skip based on the second interlaced field comprising a skip field.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   determining by at least one processor, for an individual picture of a group of pictures, an available coding bit limit and an estimated coding bit cost to code the individual picture;
   setting a coding skip indicator to skip for the individual picture when the estimated coding bit cost is greater than the available coding bit limit; and
   when the estimated coding bit cost is not greater than the available coding bit limit, providing, the option to set, by at least one processor, the coding skip indicator as either skip or non-skip based on a picture type of the individual picture and a picture structure of the group of pictures, comprising:

in an encode order of the group of pictures, if an immediately prior encode picture to the individual picture comprises at least one of an equal or higher level picture then:
determining whether or not the immediately prior encode picture comprises a skip picture, and
setting the coding skip indicator to skip the individual picture at least based on the immediately prior encode picture comprising a skip picture even though the estimated coding bit of the individual picture is less than the available coding bit limit.

2. The method of claim 1, wherein the video coding comprises advanced video coding (AVC) based video coding and the individual picture comprises a B-picture.

3. The method of claim 1, wherein the video coding comprises high efficiency video coding (HEVC) based video coding and the individual picture comprises a low level B-picture.

4. The method of claim 1, wherein the individual picture comprises, in an encode order of the group of pictures, a first B-picture and determining the coding skip indicator based on the picture type of the individual picture and the picture structure of the group of pictures comprises:
determining, in the encode order of the group of pictures, an immediately prior higher level picture to the individual picture comprises a non-skip picture;
increasing the estimated coding bit cost to generate an increased estimated coding bit cost; and
setting the coding skip indicator to skip when the increased estimated coding bit cost is greater than the available coding bit limit.

5. The method of claim 1, wherein determining the coding skip indicator based on the picture type of the individual picture and the picture structure of the group of pictures comprises:
determining a higher level picture of the group of pictures comprises a skip picture;
determining, in a display order of the group of pictures, the individual picture is prior to the higher level picture and subsequent to a second higher level picture; and
setting the coding skip indicator to skip additionally based on the higher level picture comprising a skip picture.

6. The method of claim 5, wherein the video coding comprises at least one of advanced video coding (AVC) based video coding or high efficiency video coding (HEVC) based video coding and the individual picture comprises a B-picture.

7. The method of claim 1, wherein the video coding comprises temporal scalability, the individual picture comprises a low level temporal scalability picture, and determining the coding skip indicator based on the picture type of the individual picture and the picture structure of the group of pictures comprises:
determining a higher level temporal scalability picture of the group of pictures is a skip picture;
determining, in a display order of the group of pictures, the individual picture is prior to the higher level temporal scalability picture and subsequent to a second higher level temporal scalability picture; and
setting the coding skip indicator to skip additionally based on the higher level temporal scalability picture comprising a skip picture.

8. The method of claim 1, wherein the individual picture comprises an interlaced field of an interlaced coded picture, a second interlaced field of the interlaced coded picture comprises a skip field, and determining the coding skip indicator based on the picture type of the individual picture and the picture structure of the group of pictures comprises setting the coding skip indicator to skip additionally based on the second interlaced field comprising a skip field.

9. The method of claim 1, wherein the available coding bit limit comprises a sum of a hypothetical reference decoder buffer fullness associated with an immediately prior encode picture and an average target rate for each picture of the group of pictures.

10. The method of claim 1, wherein the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

11. The method of claim 10, wherein the individual picture and the prior picture comprise the same picture type.

12. A system for video encoding comprising:
a memory to store a group of pictures; and
a graphics processor coupled to the memory, the graphics processor to:
determine, for an individual picture of the group of pictures, an available coding bit limit and an estimated coding bit cost to code the individual picture,
set a coding skip indicator to skip for the individual picture when the estimated coding bit cost is greater than the available coding bit limit, and
when the estimated coding bit cost is not greater than the available coding bit limit, provide the option to set the coding skip indicator as either skip or non-skip based on a picture type of the individual picture and a picture structure of the group of pictures, comprising:
in an encode order of the group of pictures, if an immediately prior encode picture to the individual picture comprises at least one of an equal or higher level picture then:
determining whether or not the immediately prior encode picture comprises a skip picture, and
setting the coding skip indicator to skip the individual picture at least based on the immediately prior encode picture comprising a skip picture even though the estimated coding bit of the individual picture is less than the available coding bit limit.

13. The system of claim 12, wherein the individual picture comprises, in an encode order of the group of pictures, a first B-picture and the graphics processor to determine the coding skip indicator based on the picture type of the individual picture and the picture structure of the group of pictures comprises the graphics processor to determine, in the encode order of the group of pictures, an immediately prior higher level picture to the individual picture comprises a non-skip picture, increase the estimated coding bit cost to generate an increased estimated coding bit cost, and set the coding skip indicator to skip when the increased estimated coding bit cost is greater than the available coding bit limit.

14. The system of claim 12, wherein the graphics processor to determine the coding skip indicator based on the picture type of the individual picture and the picture structure of the group of pictures comprises the graphics processor to determine a higher level picture of the group of pictures comprises a skip picture, determine, in a display order of the group of pictures, the individual picture is prior to the higher level picture and subsequent to a second higher level picture, and set the coding skip indicator to skip additionally based on the higher level picture comprising a skip picture.

15. The system of claim 12, wherein the video coding comprises temporal scalability, the individual picture comprises a low level temporal scalability picture, and the graphics processor to determine the coding skip indicator based on the picture type of the individual picture and the picture structure of the group of pictures comprises the graphics processor to determine a higher level temporal scalability picture of the group of pictures is a skip picture, determine, in a display order of the group of pictures, the individual picture is prior to the higher level temporal scalability picture and subsequent to a second higher level temporal scalability picture, and set the coding skip indicator to skip additionally based on the higher level temporal scalability picture comprising a skip picture.

16. The system of claim 12, wherein the individual picture comprises an interlaced field of an interlaced coded picture, a second interlaced field of the interlaced coded picture comprises a skip field, and the graphics processor to determine the coding skip indicator based on the picture type of the individual picture and the picture structure of the group of pictures comprises the graphics processor to set the coding skip indicator to skip additionally based on the second interlaced field comprising a skip field.

17. The system of claim 12, wherein the available coding bit limit comprises a sum of a hypothetical reference decoder buffer fullness associated with an immediately prior encode picture and an average target rate for each picture of the group of pictures and the estimated coding bit cost comprises a product of an actual coding bit cost of a prior encode picture, a ratio of a distortion of the individual picture to a distortion of the prior picture, and a ratio of a quantization parameter associated with the prior picture to a maximum quantization parameter.

18. At least one non-transitory machine readable medium comprising a plurality of instructions that in response to being executed on a computing device, cause the computing device to perform video coding by:
   determining, for an individual picture of a group of pictures, an available coding bit limit and an estimated coding bit cost;
   setting a coding skip indicator to skip for the individual picture when the estimated coding bit cost is greater than the available coding bit limit; and
   when the estimated coding bit cost is not greater than the available coding bit limit, providing the option to set the coding skip indicator as either skip or non-skip based on a picture type of the individual picture and a picture structure of the group of pictures, comprising:
      in an encode order of the group of pictures, if an immediately prior encode picture to the individual picture comprises at least one of an equal or higher level picture then:
         determining whether or not the immediately prior encode picture comprises a skip picture, and
         setting the coding skip indicator to skip the individual picture at least based on the immediately prior encode picture comprising a skip picture even though the estimated coding bit of the individual picture is less than the available coding bit limit.

19. The non-transitory machine readable medium of claim 18, wherein the individual picture comprises, in an encode order of the group of pictures, a first B-picture and determining the coding skip indicator based on the picture type of the individual picture and the picture structure of the group of pictures comprises:
   determining, in the encode order of the group of pictures, an immediately prior higher level picture to the individual picture comprises a non-skip picture;
   increasing the estimated coding bit cost to generate an increased estimated coding bit cost; and
   setting the coding skip indicator to skip when the increased estimated coding bit cost is greater than the available coding bit limit.

20. The non-transitory machine readable medium of claim 18, wherein determining the coding skip indicator based on the picture type of the individual picture and the picture structure of the group of pictures comprises:
   determining a higher level picture of the group of pictures comprises a skip picture;
   determining, in a display order of the group of pictures, the individual picture is prior to the higher level picture and subsequent to a second higher level picture; and
   setting the coding skip indicator to skip additionally based on the higher level picture comprising a skip picture.

21. The non-transitory machine readable medium of claim 18, wherein the video coding comprises temporal scalability, the individual picture comprises a low level temporal scalability picture, and determining the coding skip indicator based on the picture type of the individual picture and the picture structure of the group of pictures comprises:
   determining a higher level temporal scalability picture of the group of pictures is a skip picture;
   determining, in a display order of the group of pictures, the individual picture is prior to the higher level temporal scalability picture and subsequent to a second higher level temporal scalability picture; and
   setting the coding skip indicator to skip additionally based on the higher level temporal scalability picture comprising a skip picture.

22. The non-transitory machine readable medium of claim 18, wherein the individual picture comprises an interlaced field of an interlaced coded picture, a second interlaced field of the interlaced coded picture comprises a skip field, and determining the coding skip indicator based on the picture type of the individual picture and the picture structure of the group of pictures comprises setting the coding skip indicator to skip additionally based on the second interlaced field comprising a skip field.

* * * * *